(12) United States Patent
Dwolinski

(10) Patent No.: US 12,535,387 B2
(45) Date of Patent: *Jan. 27, 2026

(54) TYRE TEST STAND WITH A HEXAPOD ARRANGEMENT

(71) Applicant: ZF Friedrichshafen AG, Friedrichshafen (DE)

(72) Inventor: Thomas Dwolinski, Neuburg am Inn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 260 days.

This patent is subject to a terminal disclaimer.

(21) Appl. No.: 18/256,157

(22) PCT Filed: Dec. 2, 2021

(86) PCT No.: PCT/EP2021/083945
§ 371 (c)(1),
(2) Date: Jun. 6, 2023

(87) PCT Pub. No.: WO2022/122540
PCT Pub. Date: Jun. 16, 2022

(65) Prior Publication Data
US 2024/0035929 A1  Feb. 1, 2024

(30) Foreign Application Priority Data
Dec. 10, 2020  (DE) ............... 10 2020 215 617.4

(51) Int. Cl.
*G01M 17/02*  (2006.01)
(52) U.S. Cl.
CPC ........ *G01M 17/021* (2013.01); *G01M 17/022* (2013.01)

(58) Field of Classification Search
CPC ............. G01M 17/021; G01M 17/022; G01M 17/0074
See application file for complete search history.

(56) References Cited

U.S. PATENT DOCUMENTS 6,247,348 B1 * 6/2001 Yamakado .......... G01M 17/045
73/11.04
7,254,995 B2  8/2007 Leska, Sr. et al.
(Continued)

FOREIGN PATENT DOCUMENTS

DE  30 40 252 A1  10/1982
DE  10 2004 021 305 A1  11/2005
(Continued)

OTHER PUBLICATIONS

European Patent Office, International Search Report issued in International patent application No. PCT/EP2021/083943 (May 12, 2022).
(Continued)

*Primary Examiner* — Timothy P Graves
(74) *Attorney, Agent, or Firm* — Finch & Maloney PLLC

(57) ABSTRACT

A tire test stand includes a frame, a tire holder on which a tire can be mounted, a hexapod arrangement with six linear drive elements, and a rolling surface unit with a rolling surface. In a starting configuration, the linear drive elements are arranged so that at least one of the linear drive elements is arranged such that, when the at least one linear drive element exerts a force on the tire, the greatest force component of this force is oriented in the direction of a lateral force component. At least one linear drive element is arranged such that the greatest force component is oriented in the direction of a tangential force component. At least one
(Continued)

linear drive element is arranged such that the greatest force component is oriented in the direction of a radial force component.

14 Claims, 8 Drawing Sheets

(56) References Cited

U.S. PATENT DOCUMENTS

| | | | |
|---|---|---|---|
| 8,196,462 B2 | 6/2012 | Stalnaker et al. | |
| 10,585,020 B2 | 3/2020 | Smith et al. | |
| 11,644,387 B2 | 5/2023 | Trachtler et al. | |
| 2010/0037686 A1 | 2/2010 | Kitagawa et al. | |

FOREIGN PATENT DOCUMENTS

| | | | |
|---|---|---|---|
| DE | 10 2009 002 169 A1 | 10/2010 | |
| EP | 2 602 602 A1 | 6/2013 | |
| JP | 3617231 B2 * | 2/2005 | .......... G01M 17/045 |
| WO | WO1998052009 A1 | 11/1998 | |

OTHER PUBLICATIONS

European Patent Office, Written Opinion issued in International patent application No. PCT/EP2021/083943 (May 12, 2022).
German Patent Office, Search Report issued in German patent application No. 10 2020 215 612.3 (Jun. 24, 2021).
European Patent Office, International Search Report issued in International patent application No. PCT/EP2021/083945 (Mar. 23, 2022).
European Patent Office, Written Opinion issued in International patent application No. PCT/EP2021/083945 (Mar. 23, 2022).
German Patent Office, Search Report issued in German patent application No. 10 2020 215 617.4 (Jun. 24, 2021).
MTS Systems Corporation, "MTS Flat-Trac III SS Tire Test System for Steady State Force and Moment Testing of Passenger Car Tires" available at https://www.mts.com/cs/groups/public/documents/library/dev_003377.pdf (Dec. 31, 2003).
United States Patent Office, Non-Final Office Action issued in U.S. Appl. No. 18/256,152 (mailed Dec. 17, 2024).

* cited by examiner

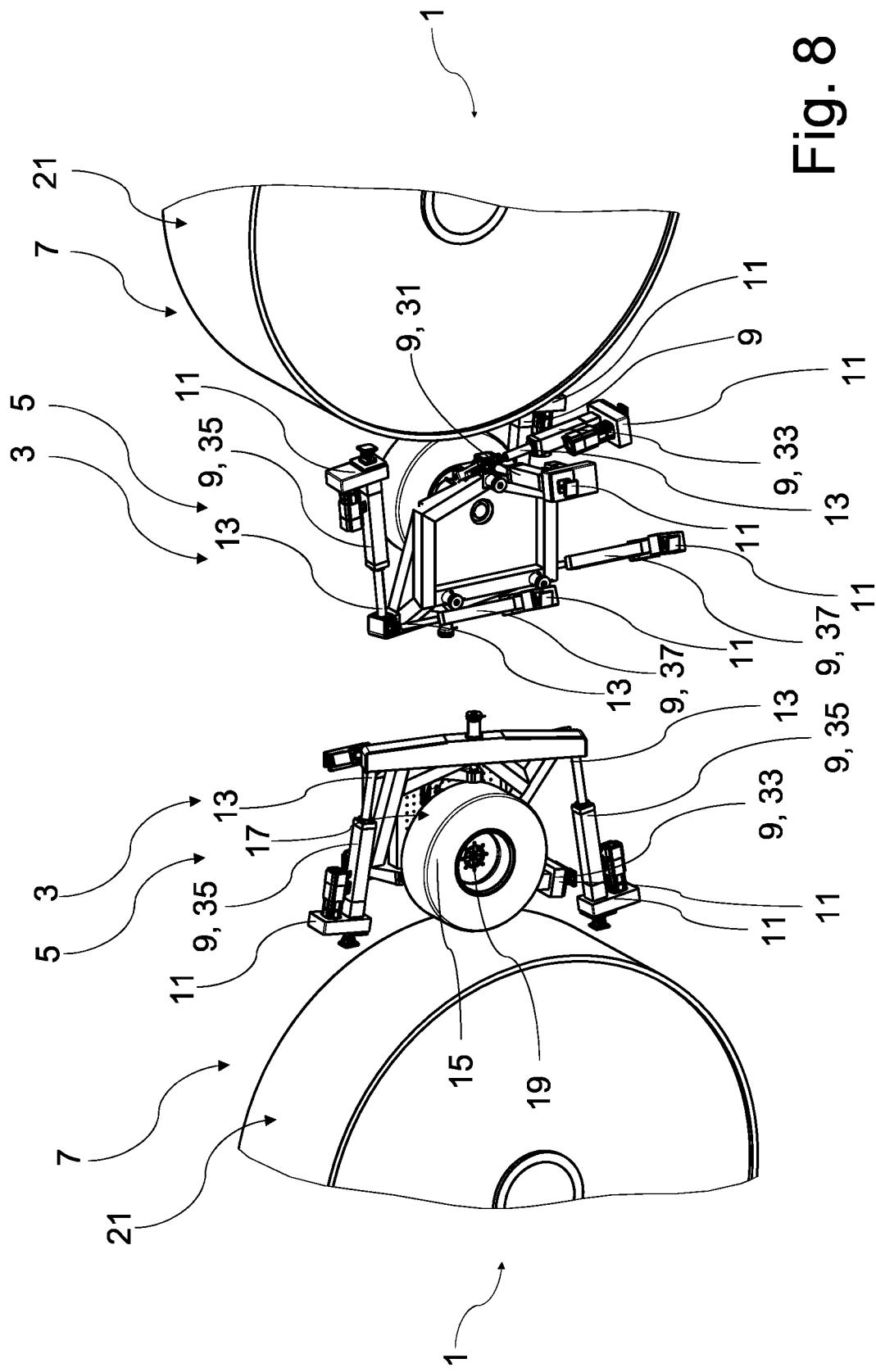

TYRE TEST STAND WITH A HEXAPOD ARRANGEMENT

RELATED APPLICATIONS

This application claims the benefit under 35 U.S.C. § 371 as a U.S. National Phase Application of application no. PCT/EP2021/083945, filed on 2 Dec. 2021, which claims benefit of German Patent Application no. 10 2019 215 617.4 filed 10 Dec. 2020, the contents of which are hereby incorporated herein by reference in their entireties

FIELD OF THE DISCLOSURE

The present invention relates to a tire test stand.

BACKGROUND

Tire test stands are known from the prior art. Said tire test stands usually have a frame and a tire holder. A tire with a tread can be attached to the tire holder so as to be rotatable about its axis of rotation. When the tire is rotatably attached to the tire holder, the tire can be moved into different positions relative to the frame.

The tire test stands known from the prior art provide a rolling surface unit with a rolling surface, which can be moved in relation to the frame. The rolling surface of the rolling surface unit may also be referred to as a substitute road and is intended to approximately simulate the conditions on a road.

When the tire is rotatably attached to the tire holder, the tire can be brought into a contact position in which the tread of the tire and the rolling surface are in contact. When the tire and the rolling surface are in contact and the rolling surface is moved in relation to the tire, the tire can roll on the rolling surface.

SUMMARY

In general, it is desirable to provide a robust, material-saving and resource-conserving tire test stand with an optimum movement space for testing tires, in which the tire can be moved during the test, with the real chassis kinematics when driving on a road being particularly well simulated.

It is therefore the object of the present invention to provide a robust, material-saving and resource-conserving tire test stand with an optimum movement space for testing tires, in which the tire can be moved during the test, with the real chassis kinematics when driving on a road being particularly well simulated.

According to the invention, the stated object is achieved by a tire test stand as variously disclosed herein. In one example embodiment, the tire test stand has a frame. The tire test stand also has a tire holder. A tire with a tread can be attached to the tire holder so as to be rotatable about its axis of rotation. The tire test stand also has a hexapod arrangement with six linear drive elements. Each of the six linear drive elements is attached at a first end to the frame and at a second end to the tire holder. The tire test stand also has a rolling surface unit with a rolling surface. The rolling surface can be moved in relation to the frame. Furthermore, when the tire is rotatably attached to the tire holder, the tire can be brought by adjustment of the linear drive elements of the hexapod arrangement into a contact position. In the contact position, the tread of the tire and the rolling surface are in contact. Furthermore, when the tread and the rolling surface are in contact and the rolling surface is moved in relation to the tire, the tire rolls on the rolling surface. In an initial configuration, a tangential plane running parallel to the axis of rotation on the tread and a tangential plane on the rolling surface are identical. Furthermore, in the initial configuration, the tangential speed of the tread and the tangential speed of the rolling surface at a contact point between the tread and the rolling surface are identical. Furthermore, each force acting on the tire can be divided into a lateral force component running in the tangent planes and parallel to the axis of rotation, a tangential force component running in the tangential planes and perpendicular to the lateral force component, and a radial force component running perpendicular to the tangential planes. Furthermore, the six linear drive elements are arranged in the initial configuration in such a manner that at least one linear drive element of the six linear drive elements is arranged such that when the at least one linear drive element exerts a force on the tire, the largest force component of said force is oriented in the direction of the lateral force component. Furthermore, the six linear drive elements are arranged in the initial configuration in such a manner that at least one linear drive element of the six linear drive elements is arranged such that when the at least one linear drive element exerts a force on the tire, the largest force component of said force is oriented in the direction of the tangential force component. Furthermore, the six linear drive elements are arranged in the initial configuration in such a manner that at least one linear drive element of the six linear drive elements is arranged such that when the at least one linear drive element exerts a force on the tire, the largest force component of said force is oriented in the direction of the radial force component.

The tire test stand has the frame. Various components of the tire test stand, such as, for example, the first end of each of the six linear drive elements, can be attached to the frame. Furthermore, an operating element for operating the tire test stand by an operator of the tire test stand can be attached to the frame of the tire test stand as one of the various components.

The tire test stand also has the tire holder. The tire with the tread can be attached to the tire holder so as to be rotatable about its axis of rotation. A tire may therefore be attached, or a tire may not be attached, to the tire holder. In particular as a result of the fact that the tire holder can be moved relative to the frame and can be brought into different positions by adjustment of the linear drive elements, a tire attached to the tire holder can be moved relative to the frame, and brought into different positions, by adjustment of the linear drive elements.

The tire test stand also has the hexapod arrangement with the six linear drive elements. In particular, the length of each linear drive element of the six linear drive elements can be adjusted. The hexapod arrangement may be referred to as parallel kinematics. One advantage of the hexapod arrangement is that it can have a high level of rigidity in comparison to conventional adjustment units, which are designed as serial kinematics, while requiring a comparatively small amount of space. The hexapod arrangement also affords the advantage that, compared to conventional adjustment units which are designed as serial kinematics, it has a high level of adjustment accuracy. In particular, the hexapod arrangement can be used to bring the tire into different positions, such as the contact position, with a high degree of precision compared to conventional adjustment units which are designed as serial kinematics. In conjunction with the present invention, it has surprisingly turned out that the hexapod arrangement can simulate the real chassis kinematics of a vehicle in a test environment better than the tire test stands known from the prior art.

Each of the six linear drive elements is attached at a first end to the frame and at a second end to the tire holder. The six linear drive elements can be described as acting parallel to one other between the frame and the tire holder, and therefore the hexapod arrangement can be described as parallel kinematics. In particular, by adjustment of the linear drive elements, the tire holder can be moved relative to the frame and brought into different positions. Preferably, each linear drive element of the six linear elements is pivotably attached at the first end to the frame and pivotably attached at the second end to the tire holder such that each linear drive element can assume different orientations by adjustment of the linear drive elements and pivoting in relation to the frame and to the tire holder.

The tire test stand also has the rolling surface unit with the rolling surface. The rolling surface can be formed by a flat belt portion of a belt which at least partially loops around two belts rotatably mounted on the frame. Preferably, the flat belt portion extends along a tangential plane to the belt, in which a contact point between the tread and the flat belt portion lies when the tire is rotatably attached to the tire holder and the tread of the tire and the flat belt portion are in contact. The evenness of the belt portion ensures that the tire can roll on a flat rolling surface. A flat rolling surface formed by the flat belt portion is particularly advantageous in comparison to a rolling surface formed in a curved manner by a peripheral outer surface of the drum, since the flat belt portion can simulate a real road, in particular its flat shape, better than tire test stands known from the prior art. in particular those with a rolling surface which is formed by a peripheral outer surface of a drum. In particular, it has been found that the rolling resistance of the tire when rolling on the flat belt portion was able to be significantly reduced compared to a curved rolling surface. Furthermore, the combination of belts and deflection pulleys provides a rolling surface which saves on space compared to a rolling surface on a drum that is large in size in order to reduce the curvature. Alternatively, the rolling surface can be a curved rolling surface which is formed by an inner circumferential surface of a drum rotatably mounted on the frame. The drum can preferably be rotatably driven with the aid of a rolling surface drive unit. As a further alternative, the rolling surface can be a curved rolling surface, which is formed by an outer circumferential surface of a drum rotatably mounted on the frame. This drum can also be driven rotatably preferably with the aid of the rolling surface drive unit. The use of a revolving surface of a rotatably mounted drum as a rolling surface ensures that a particularly large space can be provided for at least one linear drive element, in particular a lateral drive element. The provision of a particularly large space for at least one linear drive element ensures in turn that installation space can be sufficiently provided for a robust design of the at least one linear drive element.

The rolling surface can be moved in relation to the frame. For this purpose, the rolling surface can be driven with the aid of the rolling surface drive unit.

Furthermore, when the tire is rotatably attached to the tire holder, the tire can be brought by adjustment of the linear drive elements of the hexapod arrangement into a contact position. As already described, in particular as a result of the fact that the tire holder can be moved relative to the frame and can be brought into different positions by adjustment of the linear drive elements, a tire attached to the tire holder can be moved relative to the frame, and brought into different positions, by adjustment of the linear drive elements. In particular, the tire can be brought into the contact position by adjustment of the linear drive elements of the hexapod arrangement.

In the contact position, the tread of the tire and the rolling surface are in contact. Preferably, by adjustment of the linear drive elements of the hexapod arrangement, the tire can be brought into further contact positions in addition to the contact position, such that, for example, a camber of the tire, a skewing of the tire, a tire load of the tire, in particular perpendicular to the tangential plane on the rolling surface in which the contact point lies between the tread and the rolling surface, and/or the position of the tire relative to the rolling surface, in particular parallel to the tangential plane on the rolling surface, in which the contact point between the tread and the rolling surface lies, and perpendicular to the revolving direction of the rolling surface in the region of the rolling surface and/or parallel to the revolving direction of the rolling surface in the region of the rolling surface, can be adjusted.

Furthermore, when the tread and the rolling surface are in contact and the rolling surface is moved in relation to the tire, the tire rolls on the rolling surface. The rolling surface preferably forms a flat rolling surface on which the tire can roll. Alternatively preferably, the rolling surface can also form a curved rolling surface. As already described, the tire can be brought into further contact positions in addition to the contact position by adjustment of the linear drive elements of the hexapod arrangement. If the tire then rolls on the rolling surface, the tire can be brought into different load states as it rolls. For example, as the tire rolls on the rolling surface, the camber of the tire, the skewing of the tire, the tire load of the tire, in particular perpendicular to the tangential plane on the rolling surface, in which the contact point lies between the tread and the rolling surface, and/or the position of the tire relative to the rolling surface, in particular parallel to the tangential plane on the rolling surface, in which the contact point lies between the tread and the rolling surface, and perpendicular to the revolving direction of the rolling surface in the region of the rolling surface and/or parallel to the revolving direction of the rolling surface in the region of the rolling surface, can be adjusted.

In an initial configuration, a tangential plane running parallel to the axis of rotation on the tread and a tangential plane on the rolling surface are identical. Furthermore, in the initial configuration, the tangential speed of the tread and the tangential speed of the rolling surface at a contact point between the tread and the rolling surface are identical. Preferably, in the initial configuration, the steering angle is zero and the camber angle is zero. In particular, with a steering angle not equal to zero and with a camber angle equal to zero, the tangential plane running parallel to the axis of rotation on the tread and the tangential plane on the rolling surface continue to be identical. Preferably, however, with a steering angle not equal to zero and with a camber angle equal to zero, the tangential speed of the tread and the tangential speed of the rolling surface at a contact point between the tread and the rolling surface are not identical. In particular, with a steering angle not equal to zero and with a camber angle equal to zero, the tire test stand takes up a configuration which does not correspond to the initial configuration. In addition, in particular with a camber angle not equal to zero and a steering angle equal to zero, the tangential plane running parallel to the axis of rotation on the tread and the tangential plane on the rolling surface are not identical. Preferably, however, with a camber angle not equal to zero and with a steering angle equal to zero, the tangential speed of the tread and the tangential speed of the rolling surface at a contact point between the tread and the rolling surface are identical. In particular, with a camber angle not equal to zero and with a steering angle equal to zero, the tire test stand takes up a configuration which does not correspond to the initial configuration. The contact point between the tread and the rolling surface may also be referred to as the wheel contact point.

Furthermore, each force acting on the tire can be divided into a lateral force component running in the tangent planes and parallel to the axis of rotation, a tangential force component running in the tangential planes and perpendicular to the lateral force component, and a radial force component running perpendicular to the tangential planes. In particular, the lateral force component, the tangential force component and the radial force component are oriented perpendicular to one another.

Furthermore, the six linear drive elements are arranged in the initial configuration in such a manner that at least one linear drive element of the six linear drive elements is arranged such that when the at least one linear drive element exerts a force on the tire, the largest force component of said force is oriented in the direction of the lateral force component. The at least one linear drive element of the six linear drive elements, which is arranged such that when the at least one linear drive element exerts a force on the tire, the largest force component of said force is oriented in the direction of the lateral force component, can also be referred to as a lateral drive element. The six linear drive elements preferably have a lateral drive element.

Furthermore, the six linear drive elements are arranged in the initial configuration in such a manner that at least one linear drive element of the six linear drive elements is arranged such that when the at least one linear drive element exerts a force on the tire, the largest force component of said force is oriented in the direction of the tangential force component. The at least one linear drive element of the six linear drive elements, which is arranged such that when the at least one linear drive element exerts a force on the tire, the largest force component of said force is oriented in the direction of the lateral force component, can also be referred to as a tangential drive element. The six linear drive elements preferably have a tangential drive element.

The lateral drive element and the tangential drive element are preferably pivotably attached to the tire holder in such a manner that a first straight line, which is oriented along the main direction of extent of the lateral drive element, and a second straight line, which is oriented along the main direction of extent of the tangential drive element, intersect. The first straight line, which is oriented along the main direction of extent of the lateral drive element, and the second straight line, which is oriented along the main direction of extent of the tangential drive element, preferably intersect at an angle of 90°. Preferably, the lateral drive element and the tangential drive element are pivotably attached to the tire holder in such a manner that the attachment points are arranged less than a width of the rolling surface perpendicular to the revolving direction of the rolling surface from the contact point between the tread and the flat belt portion.

Furthermore, the six linear drive elements are arranged in the initial configuration in such a manner that at least one linear drive element of the six linear drive elements is arranged such that when the at least one linear drive element exerts a force on the tire, the largest force component of said force is oriented in the direction of the radial force component. The at least one linear drive element of the six linear drive elements, which is arranged such that when the at least one linear drive element exerts a force on the tire, the largest force component of said force is oriented in the direction of the radial force component, can also be referred to as a radial drive element.

In summary, it can thus be stated that the tire test stand has at least one lateral drive element, at least one tangential drive element and at least one radial drive element. Each of said linear drive elements is configured in such a manner that it fulfills a specific function in particular differing from the other linear drive elements, in relation to the lateral force component, the tangential force component and the radial force component. The lateral drive element is namely configured in such a manner that when the at least one linear drive element exerts a force on the tire, the largest force component of said force is oriented in the direction of the lateral force component, the tangential drive element is configured in such a manner that when the at least one linear drive element exerts a force on the tire, the largest force component of said force is oriented in the direction of the tangential force component and the radial drive element is configured in such a manner that when the at least one linear drive element exerts a force on the tire, the largest force component of said force is oriented in the direction of the radial force component.

In the case of the hexapod arrangements known from the prior art, the six linear drive elements, in particular due to the symmetrical structure of said hexapod arrangements, are not configured in such a manner that each of the three linear drive elements of the six linear drive elements can fulfill a specific function differing from the functions of the other linear drive elements of the three linear drive elements, in particular with respect to the lateral force component, the tangential force component and the radial force component. The hexapod arrangements known from the prior art have identically designed linear drive elements which, for example, have the same lengths, are arranged symmetrically to one another, form the same angles to one another and are configured for the same forces. In principle, the hexapod arrangements known from the prior art can also be used in tire test stands, since they would also allow an upward and downward movement, a lateral movement and an angular movement of the tire holder. However, the hexapod arrangements known from the prior art would have to be more solid than the tire test stand according to the invention in order to be able to exert the same forces on a tire on the tire holder during testing. The use of the at least one lateral drive element, the at least one tangential drive element and the at least one radial drive element thus permits a particularly material-saving and resource-saving tire test stand. Owing to the use of the at least one lateral drive element, the at least one tangential drive element and the at least one radial drive element, it is possible to design the lateral drive element, the tangential drive element and the radial drive element differently, such that, for example, depending on which adjustment lengths are desired for positioning the tire, the adjustment lengths of the at least one lateral drive element, the at least one tangential drive element and the at least one radial drive element can differ. For example, the hexapod arrangement according to the invention could therefore be configured such that a skewing adjustment is greater than a camber adjustment or that a wheel infeed is greater than a lateral adjustment or tangential adjustment. A tire test stand with an optimum movement space for testing tires and in which the tire can be moved during the test can thus be provided. Furthermore, the at least one lateral drive element, the at least one tangential drive element and the at least one radial drive element can be configured for the lateral force component, tangential force component and radial force component to be anticipated when testing the tire, which in particular permits a material-saving and resource-saving tire test stand.

In particular, it has been found in conjunction with the present invention that the combination of at least one lateral drive element, at least one tangential drive element and at least one radial drive element can significantly enlarge the movement space, in which the tire can be moved during testing, in particular compared to a movement space in a possible use of a hexapod arrangement known from the prior art, without the hexapod arrangement coming into movement singularities, in which an adjustment of the linear drive elements does not lead to the desired movement of the tire holder, and therefore a robust tire test stand is provided.

It has also been found in conjunction with the present invention that the combination of at least one lateral drive element, at least one tangential drive element and at least one radial drive element can simulate the real chassis kinematics when driving on a road particularly well.

In summary, it can therefore be stated that the present invention provides a robust, material-saving and resource-conserving tire test stand with an optimum movement space for testing tires, in which the tire can be moved during the test, with the real chassis kinematics when driving on a road being particularly well simulated.

In one embodiment, when the tire is rotatably attached to the tire holder and said tire is in the contact position, the at least one linear drive element, which is arranged such that when the at least one linear drive element exerts a force on the tire, the largest force component of said force is oriented in the direction of the lateral force component, is arranged in a direction which runs parallel to the direction of the radial force component. In particular, the lateral drive element is thus arranged in a direction which runs parallel to the direction of the radial force component. An arrangement of the lateral drive element in the direction which runs parallel to the direction of the radial force component enables the lateral drive element to be arranged in the vicinity of the contact point between the tread and the rolling surface. An arrangement of the lateral drive element in the vicinity of the contact point between the tread and the rolling surface is particularly advantageous for large camber angles, especially when testing motorcycle tires, since this arrangement ensures an optimum and direct power flow of the lateral drive element.

In one embodiment, two linear drive elements of the six linear drive elements are each arranged such that when the two linear drive elements exert forces on the tire, the greatest force component of said forces is oriented in the direction of the radial force component. The six linear drive elements accordingly preferably have two radial drive elements. In particular, the radial drive elements are arranged in such a manner that the tire is arranged centrally between the radial drive elements. The two radial drive elements are preferably arranged symmetrically with respect to the contact point between the tread and the rolling surface. In particular, bending moments caused by the radial force component can be reduced or even completely avoided by a symmetrical arrangement of the two radial drive elements with respect to the contact point between the tread and the rolling surface. Preferably, each of the radial drive elements is pivotably attached at its first end to the frame. In this case, the two pivot axes preferably run along the same straight line on which the contact point is also arranged. As a result, when the tire is adjusted into different contact positions, the tire load vectors running along the radial drive elements can approximately maintain the same distance from the contact point. Furthermore, the radial drive elements are pivotably attached at the second ends to the tire holder, with the two pivot axes running along the same straight line. In the initial configuration, the two radial drive elements are preferably aligned perpendicular to the tangential planes and aligned parallel to each other. More preferably, in the initial configuration, the two radial drive elements extend at an angle to each other from the portion of the tire holder toward the tangential planes, with the distance between the two radial drive elements increasing from the portion of the tire holder toward the tangential planes. If the two radial drive elements in the initial configuration extend at an angle to each other from the portion of the tire holder toward the tangential planes, with the distance between the two radial drive elements increasing from the portion of the tire holder to the tangential planes, the tire test stand is designed to be particularly rigid.

In one embodiment, when the tire is rotatably attached to the tire holder, the tire is arranged in the contact position between the two linear drive elements which are each arranged such that when the two linear drive elements each exert a force on the tire, the largest force component of each of said forces is oriented in the direction of the radial force component. Accordingly, in the contact position, the tire is preferably arranged between the two radial drive elements. In particular, the radial drive elements are arranged in such a manner that the tire is arranged centrally between the radial drive elements. The two radial drive elements are preferably arranged symmetrically with respect to the contact point between the tread and the rolling surface. In particular, bending moments caused by the radial force component can be reduced or even completely avoided by a symmetrical arrangement of the two radial drive elements with respect to the contact point between the tread and the rolling surface.

In one embodiment, the two linear drive elements, which are each arranged such that when the two linear drive elements each exert a force on the tire, the greatest force component of each of said forces is oriented in the direction of the radial force component, are offset from one another in the direction of the axis of rotation in the initial configuration. An offset arrangement of the radial drive elements in the direction of the axis of rotation in the initial configuration (in the direction of the axis of rotation of the tire in the initial configuration) is particularly advantageous when the tire test stand is arranged horizontally, i.e. when the tire holder is arranged horizontally next to the rolling surface unit. Owing to the fact that the radial drive elements are offset from one another in the direction of the axis of rotation in the initial configuration, the tire can, for example, be moved from above to the tire holder and upward away therefrom. Owing to the fact that the radial drive elements can be offset from one another in the direction of the axis of rotation in the initial configuration, heavy tires in particular can be attached to and removed from the tire test stand using a crane.

In one embodiment, at least one linear drive element of the six linear drive elements is arranged in the initial configuration such that, by adjustment of the at least one linear drive element, the tire can be pivoted about a horizontal axis and a vertical axis from its orientation in the initial configuration. The at least one linear drive element of the six linear drive elements, which is arranged in the initial configuration such that, by adjustment of the at least one linear drive element, the tire can be pivoted about a horizontal axis and a vertical axis from its orientation in the initial configuration, can also be referred to as a steering/camber drive element. Preferably, the steering/camber drive element is pivotably attached at the first end to the frame and is pivotably attached at the second end to the tire holder. The at least one steering/camber drive element is preferably pivotably attached to the tire holder in such a manner that the attachment point is arranged further away from the contact point between the tread and the rolling surface than the attachment points of the lateral drive element and the tangential drive element are, in particular further from the contact point between the tread and the rolling surface than the length of the at least one radial drive element in the initial configuration. An attachment point of the at least one steering/camber drive element on the tire holder that is arranged away from the contact point between the tread and the rolling surface ensures that a comparatively small force has to be exerted by the at least one steering/camber drive element on the tire in order to pivot the latter about the horizontal axis and the vertical axis.

In one embodiment, two linear drive elements of the six linear drive elements are in each case arranged in the initial configuration such that, by adjustment of the two linear drive elements, the tire can be pivoted about a horizontal axis and a vertical axis from its orientation in the initial configuration. The two linear drive elements of the six linear drive elements, which two linear drive elements are arranged in the initial configuration such that, by adjustment of the two linear drive elements, the tire can be pivoted about a horizontal axis and a vertical axis from its orientation in the initial configuration, can also be referred to as a steering/camber drive element.

In one embodiment, the tire holder has a first pivot arm which is pivotably attached to the frame and to which a second end of a first linear drive element of the at least one linear drive element is pivotably attached, which pivot arm is arranged in the initial configuration such that, by adjustment of the linear drive element, the tire can be pivoted about a horizontal axis and a vertical axis from its orientation in the initial configuration. The tire holder thus has a first pivot arm which is pivotably attached to the frame and to which the second end of a first steering/camber drive element is pivotably attached. Owing to the fact that the tire holder has a first pivot arm which is pivotably attached to the frame and to which the second end of the first steering/camber drive element is pivotably attached, the first steering/camber drive element can be shorter, since the first pivot arm can be used to ensure that a comparatively small force has to be exerted by the first steering/camber drive element on the tire in order to pivot the latter about the horizontal axis and the vertical axis. The tire holder preferably has a first coupling rod which is pivotably attached to the first pivot arm. In particular, the first coupling rod can be pivotably attached to a portion of the tire holder. Preferably, the second end of the first steering/camber drive element is pivotably attached to the first pivot arm.

In one embodiment, the tire holder has a second pivot arm which is pivotably attached to the frame and to which a second end of a second linear drive element of the at least one linear drive element is pivotably attached, which pivot arm is arranged in the initial configuration such that, by adjustment of the linear drive element, the tire can be pivoted about a horizontal axis and a vertical axis from its orientation in the initial configuration. Thus, the tire holder has a second pivot arm which is pivotably attached to the frame and to which the second end of a second steering/camber drive element is pivotably attached. Due to the fact that the tire holder has a second pivot arm which is pivotably attached to the frame and on which the second end of the second steering/camber drive element is pivotably attached, the second steering/camber drive element can be made shorter, since the second pivot arm can be used to ensure that a comparatively small force has to be exerted by the second steering/camber drive element on the tire in order to pivot it about the horizontal axis and the vertical axis. The tire holder preferably has a second coupling rod which is pivotably attached to the second pivot arm. In particular, the second coupling rod can be pivotably attached to a portion of the tire holder. Preferably, the second end of the second steering/camber drive element is pivotably attached to the second pivot arm.

The first coupling rod and the second coupling rod are preferably arranged parallel to each other. Particularly preferably, the first coupling rod and the second coupling rod extend at an angle to each other from the portion of the tire holder to the first pivot arm or toward the second pivot arm, with the distance between the first coupling rod and the second coupling rod increasing from the portion of the tire holder toward the first pivot arm or toward the second pivot arm. This extent of the first coupling rod and the second coupling rod at an angle to each other provides a particularly rigid tire test stand.

The first radial drive element and the first coupling rod are preferably pivotably attached to the tire holder in such a manner that a first straight line, which is oriented along the main direction of extent of the first radial drive element, and a second straight line, which is oriented along the main direction of extent of the first coupling rod, intersect. More preferably, the second radial drive element and the second coupling rod are pivotably attached to the tire holder in such a manner that a first straight line, which is oriented along the main direction of extent of the second radial drive element, and a second straight line, which is oriented along the main direction of extent of the second coupling rod, intersect. This provides a comparatively large and stable working range for the adjustment of the tire.

In one embodiment, the tire holder has a frame portion fastened to the frame and a tire portion to which the tire can be rotatably attached, wherein the frame portion and the tire portion are connected via a force measuring unit, the force measuring unit having at least one lateral force measuring element which extends in the direction of the lateral force component, at least one tangential force measuring element which extends in the direction of the tangential force component, and at least one radial force measuring element which extends in the direction of the radial force component when the tire test stand is in the initial configuration. The extent of the at least one lateral force measuring element in the direction of the lateral force component, the extent of the at least one tangential force measuring element in the direction of the tangential force component and of the at least one radial force measuring element in the direction of the radial force component ensure precise detection of the different force components, preferably independently of one another.

In one embodiment, at least one of the linear drive elements of the hexapod arrangement is designed as a hydraulic cylinder. The design of at least one of the linear drive elements of the hexapod arrangement as a hydraulic cylinder ensures that comparatively high forces can be transmitted. Furthermore, the design of at least one of the linear drive elements of the hexapod arrangement as a hydraulic cylinder ensures uniform and precise adjustment movements. In particular, the positioning accuracy of the hexapod arrangement can be increased by designing at least one of the linear drive elements of the hexapod arrangement as a hydraulic cylinder. Each of the linear drive elements of the hexapod arrangement is particularly preferably designed as a hydraulic cylinder. The advantages mentioned for the at least one linear drive element apply correspondingly to each of the linear drive elements.

In one embodiment, at least one of the linear drive elements of the hexapod arrangement is designed as an electromechanical linear drive. The design of at least one of the linear drive elements of the hexapod arrangement as an electromechanical linear drive ensures comparatively high adjustment speeds and high adjustment accelerations for adjusting the linear drive elements. Furthermore, the design of at least one of the linear drive elements of the hexapod arrangement as an electromechanical linear drive ensures uniform and precise adjustment movements. In particular, the positioning accuracy of the hexapod arrangement can be increased by designing at least one of the linear drive elements of the hexapod arrangement as an electromechanical linear drive. Each of the linear drive elements of the hexapod arrangement is particularly preferably designed as an electromechanical linear drive. The advantages mentioned for the at least one linear drive element apply correspondingly to each of the linear drive elements.

In one embodiment, the tire test stand has a tire drive unit which, when the tire is rotatably attached to the tire holder, can drive said tire in a tire revolving direction. With the aid of the tire drive unit, the tire can be driven in the revolving direction of the tire and thus set into a rotational movement about its axis of rotation. Furthermore, with the aid of the tire drive unit, the tire can be accelerated in the revolving direction of the tire when rolling on the flat belt portion such that the tire can be brought into a further load state. In the event that the tire test stand does not have a belt drive unit, by driving the tire in the tire revolving direction and contact between the tread and the flat belt portion, the belt can be driven in the belt revolving direction.

In one embodiment, the tire test stand has a tire braking unit which, when the tire is rotatably attached to the tire holder, can brake said tire in a tire revolving direction. With the aid of the tire braking unit, the tire can be braked in the tire revolving direction and the rotational movement about its axis of rotation can thus be slowed down. The rotational speed of the tire can be reduced in the tire revolving direction with the aid of the tire braking unit. Furthermore, with the aid of the tire braking unit, the tire can be braked in the revolving direction of the tire when rolling on the flat belt portion such that the tire can be brought into a further load state.

Further features, advantages and possibilities of use of the present invention will emerge from the following description of exemplary embodiments and the figures. All the features described and/or illustrated pictorially form the subject matter of the invention on their own and in any combination, also independently of their composition in the individual claims or their dependency references. In the figures, the same reference symbols continue to represent the same or similar objects.

BRIEF DESCRIPTION OF THE DRAWINGS

FIG. 8 shows two schematic views of a fourth embodiment of the tire test stand according to the invention.

DETAILED DESCRIPTION

Figure 1:
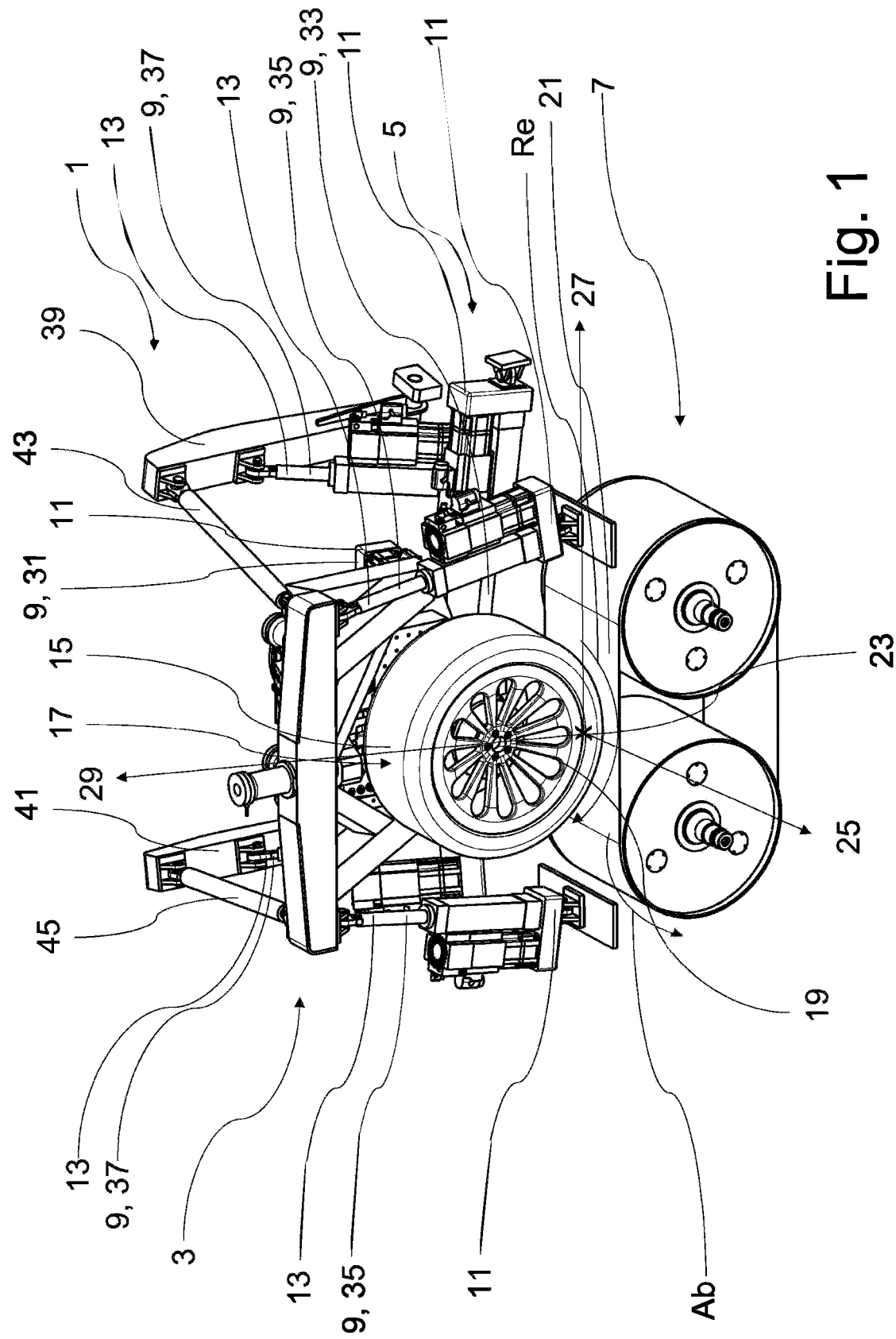
FIGS. 1 and 2 each show a schematic view of a first embodiment of a tire test stand according to the invention.
Figure 2:
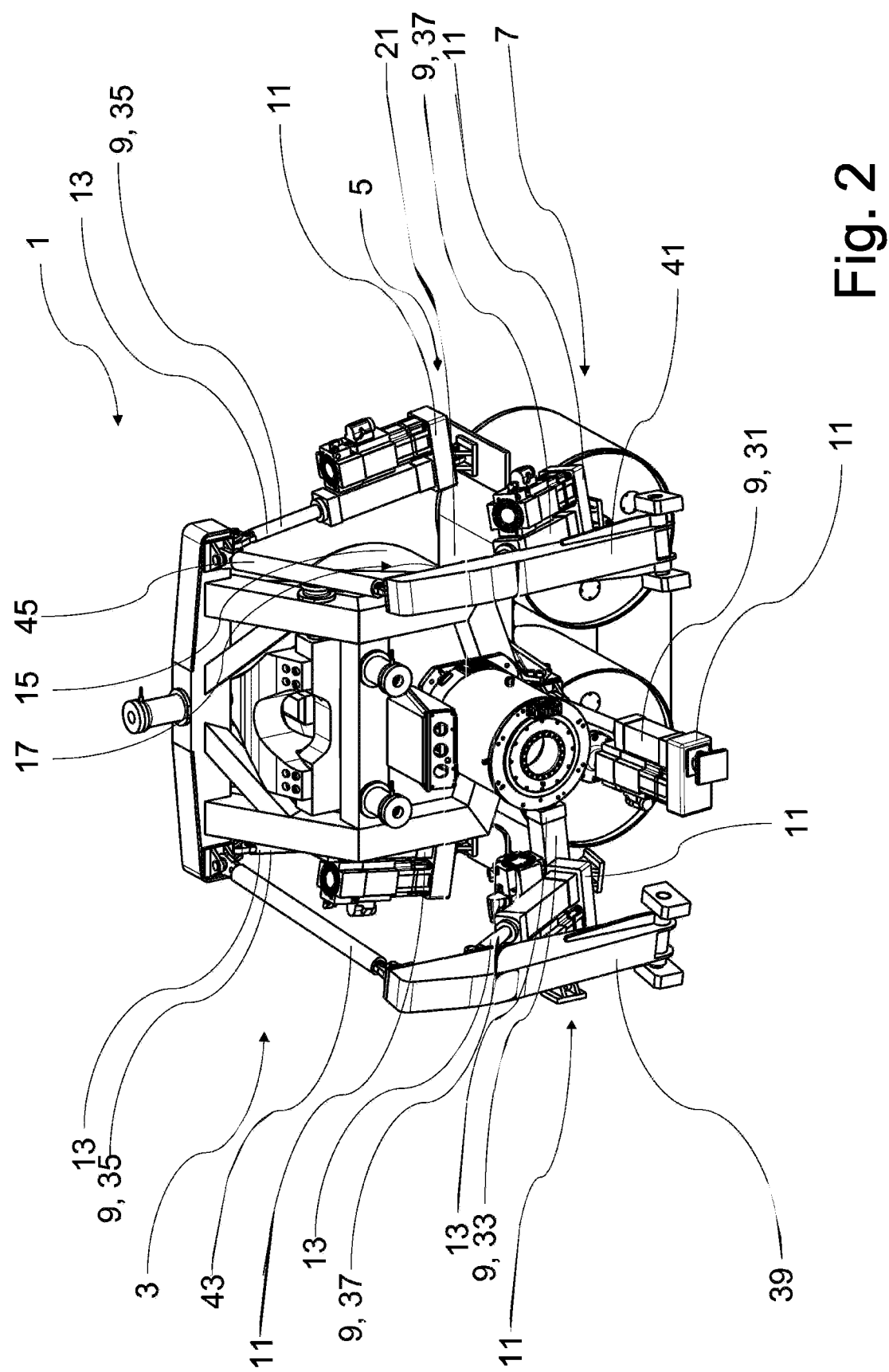

FIGS. 1 and 2 each show a schematic view of a first embodiment of a tire test stand 1 according to the invention. The tire test stand 1 has a frame, not illustrated in FIGS. 1 and 2, a tire holder 3, a hexapod arrangement 5, and a rolling surface unit 7. The tire test stand 1 also has a tire drive unit, not illustrated in FIGS. 1 and 2, a tire braking unit, also not illustrated in FIGS. 1 and 2, and a rolling surface drive unit, also not illustrated in FIGS. 1 and 2.

The hexapod arrangement 5 has six linear drive elements 9. Each of the six linear drive elements 9 has a first end 11 and a second end 13. Each of the six linear drive elements 9 is attached at the first end 11 to the frame and at the second end 13 to the tire holder 3. In the first embodiment of the tire test stand 1 according to the invention illustrated in FIGS. 1 and 2, each of the six linear drive elements 9 of the hexapod arrangement 5 is designed as an electromechanical linear drive. Alternatively, each of the six linear drive elements 9 of the hexapod arrangement 5 can also be designed as a hydraulic cylinder by retrofitting.

Furthermore, FIGS. 1 and 2 illustrate a tire 15 with a tread 17. The tire 15 is attached to the tire holder 3 so as to be rotatable about its axis of rotation 19. The tire drive unit can drive the tire 15, which is rotatably attached to the tire holder 3, in a tire revolving direction Re. The tire braking unit can brake the tire 15, which is rotatably attached to the tire holder 3, in the tire revolving direction Re, i.e. can reduce the rotational speed of the tire 15 in the tire revolving direction Re.

As already mentioned, the tire test stand 1 has the rolling surface unit 7. The rolling surface unit 7 has a flat rolling surface 21. The rolling surface 21 can be moved in relation to the frame. The tire 15, which is rotatably attached to the tire holder 3, can be brought by adjustment of the linear drive elements 9 of the hexapod arrangement 5 into a contact position, which is illustrated in FIGS. 1 and 2 and in which the tread 17 of the tire 15 and the rolling surface 21 are in contact.

As already described, the tire test stand 1 has the tire drive unit. The tire drive unit can drive the tire 15, which is rotatably attached to the tire holder 3, in the tire revolving direction Re. The rolling surface drive unit can drive the rolling surface 21 in a rolling surface revolving direction Ab. When the tread 17 and the rolling surface 21 are in contact and the rolling surface 21 is moved in relation to the tire 15, the tire 15 rolls on the rolling surface 21.

In the first embodiment illustrated in FIGS. 1 and 2, the tire 15 can be positioned with respect to the rolling surface 21 using the hexapod arrangement 5. In particular, the tire 15 can be brought by adjustment of the linear drive elements 9 of the hexapod arrangement 5 into the contact position in which the tread 17 of the tire 15 is in contact with the rolling surface 21. Furthermore, by adjustment of the linear drive elements 9 of the hexapod arrangement 5, the tire 15, in addition to the contact position illustrated in FIGS. 1 and 2, can be brought into further contact positions in which the tread 17 of the tire 15 is also in contact with the rolling surface 21. If the tire 15 then rolls on the rolling surface 21, the tire 15 is brought into different load states as it rolls. By adjustment of the linear drive elements 9 when the tire 15 rolls on the rolling surface 21, the camber of the tire 15, the skewing of the tire 15, the tire load of the tire 15, and/or the position of the tire 15 relative to the rolling surface 21, for example, can be adjusted. In addition, the tire 15 can be driven in the tire revolving direction Re by the tire drive unit or braked in the tire revolving direction Re by the tire braking unit. As a result, the tire 15 can be brought into different load states as it rolls.

FIGS. 1 and 2 illustrate the tire test stand 1 in an initial configuration. In this initial configuration, a tangential plane running parallel to the axis of rotation 19 on the tread 17 and a tangential plane on the rolling surface 21 are identical. In particular, there is a contact point 23 between the tread 17 and the rolling surface 21 in both tangential planes. Furthermore, in the initial configuration, the tangential speed of the tread 17 and the tangential speed of the rolling surface 21 at the contact point 23 between the tread 17 and the rolling surface 21 are identical. Each force acting on the tire 15 can be divided into a lateral force component 25, a tangential force component 27, and a radial force component 29. The lateral force component 25 runs in the tangential planes and parallel to the axis of rotation 19. The tangential force component 27 runs in the tangential planes and perpendicular to the lateral force component 25. The radial force component 29 runs perpendicular to the tangential planes.

The present invention is advantageous in relation to the prior art in particular because of the configuration of the six linear drive elements 9, since the six linear drive elements 9 are not arranged symmetrically to one another as in the hexapod arrangements known from the prior art.

In the initial configuration illustrated in FIGS. 1 and 2, the six linear drive elements 9 are namely arranged in such a manner that one linear drive element 9 of the six linear drive elements 9 is arranged such that when the one linear drive element 9 exerts a force on the tire 15, the largest force component of said force is oriented in the direction of the lateral force component 25. Said linear drive element 9 may also be referred to as a lateral drive element 31.

Furthermore, in the initial configuration illustrated in FIGS. 1 and 2, the six linear drive elements 9 are arranged in such a manner that one linear drive element 9 of the six linear drive elements 9 is arranged such that when the one linear drive element 9 exerts a force on the tire 15, the largest force component of said force is oriented in the direction of the tangential force component 27. Said linear drive element 9 may also be referred to as a tangential drive element 33.

Furthermore, in the initial configuration illustrated in FIGS. 1 and 2, the six linear drive elements 9 are arranged in such a manner that two linear drive elements 9 of the six linear drive elements 9 are in each case arranged such that when the two linear drive elements 9 exert forces on the tire 15, the largest force component of said forces is oriented in the direction of the radial force component 29. Said two linear drive elements 9 may also be referred to as radial drive elements 35. The radial drive elements 35 are arranged in such a manner that the tire 15 is arranged centrally between the radial drive elements 35. Each of the radial drive elements 35 is pivotably attached at its first end 11 to the frame, the two pivot axes extending along the same straight line on which the contact point 23 is also arranged. Furthermore, the radial drive elements 35 are pivotably attached at the second ends 13 to the tire holder 3, the two pivot axes running along the same straight line.

Furthermore, in the initial configuration illustrated in FIGS. 1 and 2, the six linear drive elements 9 are arranged in such a manner that two linear drive elements 9 of the six linear drive elements 9 are each arranged in the initial configuration such that, by adjustment of the two linear drive elements 9, the tire 15 can be pivoted from its orientation in the initial configuration about a horizontal axis, which runs parallel to the tangential force component 27 and in the tangential planes in FIGS. 1 and 2, and a vertical axis, which runs along the radial force component 29 in FIGS. 1 and 2. Said two linear drive elements 9 may also be referred to as steering/camber drive elements 37. The tire holder 3 has a first pivot arm 39 which is pivotably attached to the frame and a second pivot arm 41 which is pivotably attached to the frame. Furthermore, the tire holder 3 has a first coupling rod 43 which is pivotably attached to the first pivot arm 39 and a second coupling rod 45 which is pivotably attached to the second pivot arm 41. The first coupling rod 43 and the second coupling rod 45 are each pivotably attached to a portion of the tire holder 3 The second end 13 of a first steering/camber drive element 37 of the two steering/camber drive elements 37 is pivotably attached to the first pivot arm 39. The second end 13 of a second steering/camber drive element 37 of the two steering/camber drive elements 37 is pivotably attached to the second pivot arm 41.

In the first embodiment of the tire test stand 1 illustrated in FIGS. 1 and 2, the two radial drive elements 35 are not aligned perpendicular to the tangential planes and are not aligned parallel to each other. Rather, the two radial drive elements 35 extend at an angle to each other from the portion of the tire holder 3 toward the tangential planes, the distance between the two radial drive elements 35 increasing from the portion of the tire holder 3 toward the tangential planes.

Furthermore, in the first embodiment of the tire test stand 1 illustrated in FIGS. 1 and 2, the first coupling rod 43 and the second coupling rod 45 are not arranged parallel to each other. Rather, the first coupling rod 43 and the second coupling rod 45 extend at an angle to each other from the portion of the tire holder 3 to the first pivot arm 39 or toward the second pivot arm 41, with the distance between the first coupling rod 43 and the second coupling rod 45 increasing from the portion of the tire holder toward the first pivot arm 39 or toward the second pivot arm 41.

Furthermore, the lateral drive element 31 and the tangential drive element 33 are pivotably attached to the tire holder 3 in such a manner that a first straight line, which is oriented along the main direction of extent of the lateral drive element 31, and a second straight line, which is oriented along the main direction of extent of the tangential drive element 33, intersect.

In addition, the first radial drive element 35 and the first coupling rod 43 are pivotably attached to the tire holder 3 in such a manner that a first straight line, which is oriented along the main direction of extent of the first radial drive element 35, and a second straight line, which is oriented along the main direction of extent of the first coupling rod 43, intersect.

Furthermore, the second radial drive element 35 and the second coupling rod 45 are pivotably attached to the tire holder 3 in such a manner that a first straight line, which is oriented along the main direction of extent of the second radial drive element 35, and a second straight line, which is oriented along the main direction of extent of the second coupling rod 45, intersect.

Figure 3:
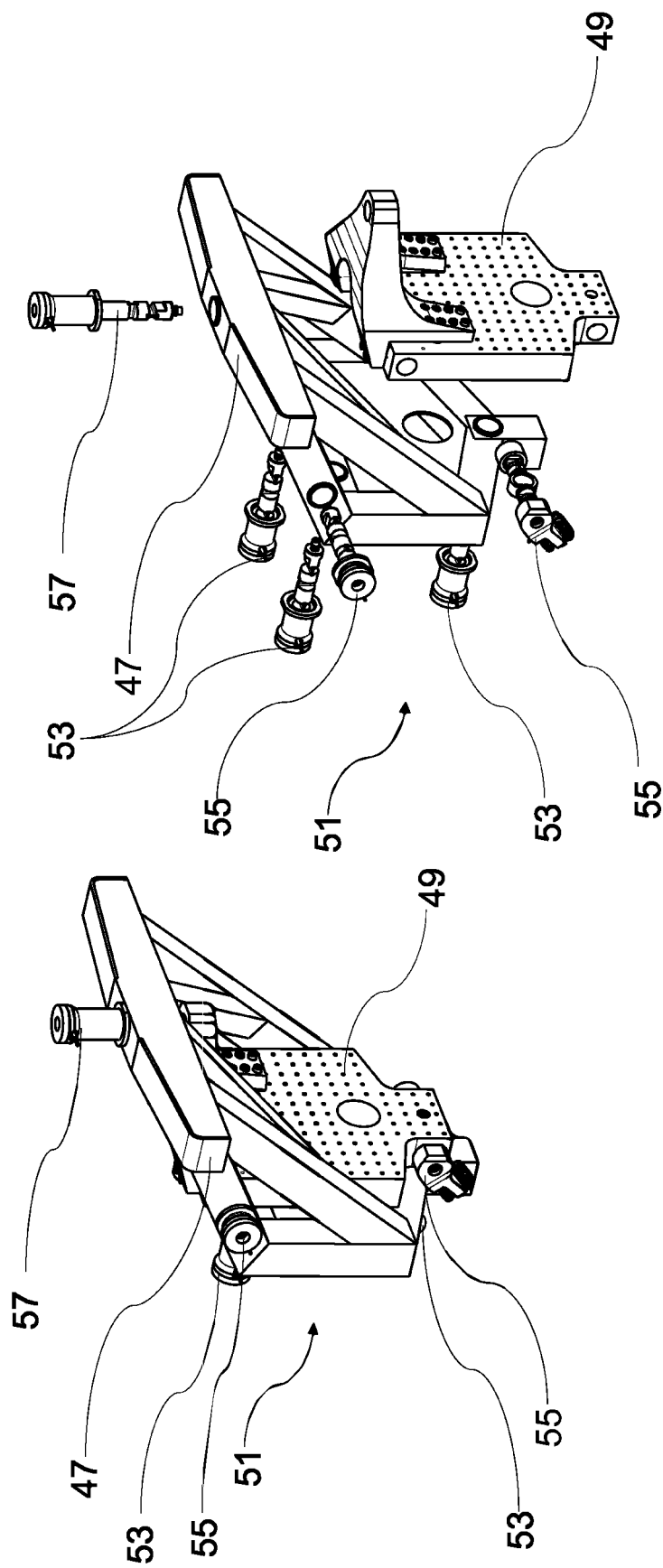
FIG. 3 shows two schematic views of a frame portion, a tire portion and a force measuring unit of the first embodiment of the tire test stand according to the invention, FIGS. 4 and 5 each show a schematic view of a second embodiment of the tire test stand according to the invention, FIGS. 6 and 7 each show a schematic view of a third embodiment of the tire test stand according to the invention.

FIG. 3 shows a frame portion 47, a tire portion 49 and a force measuring unit 51 of the tire holder 3 of the first embodiment of the tire test stand 1 according to the invention. The frame portion 47 is fastened to the frame. As illustrated in FIGS. 1 and 2, the tire 15 is rotatably attached to the tire portion 49. The frame portion 47 and the tire portion 49 are connected to each other via the force measuring unit 51. The force measuring unit 51 has three lateral force measuring elements 53 which extend in the direction of the lateral force component 25 (see FIGS. 1 and 2). Furthermore, the force measuring unit 51 has two tangential force measuring elements 55 which extend in the direction of the tangential force component 27 (see FIGS. 1 and 2). Furthermore, the force measuring unit 51 has a radial force measuring element 57 which extends in the direction of the radial force component 29 (see FIGS. 1 and 2).

Figure 4:
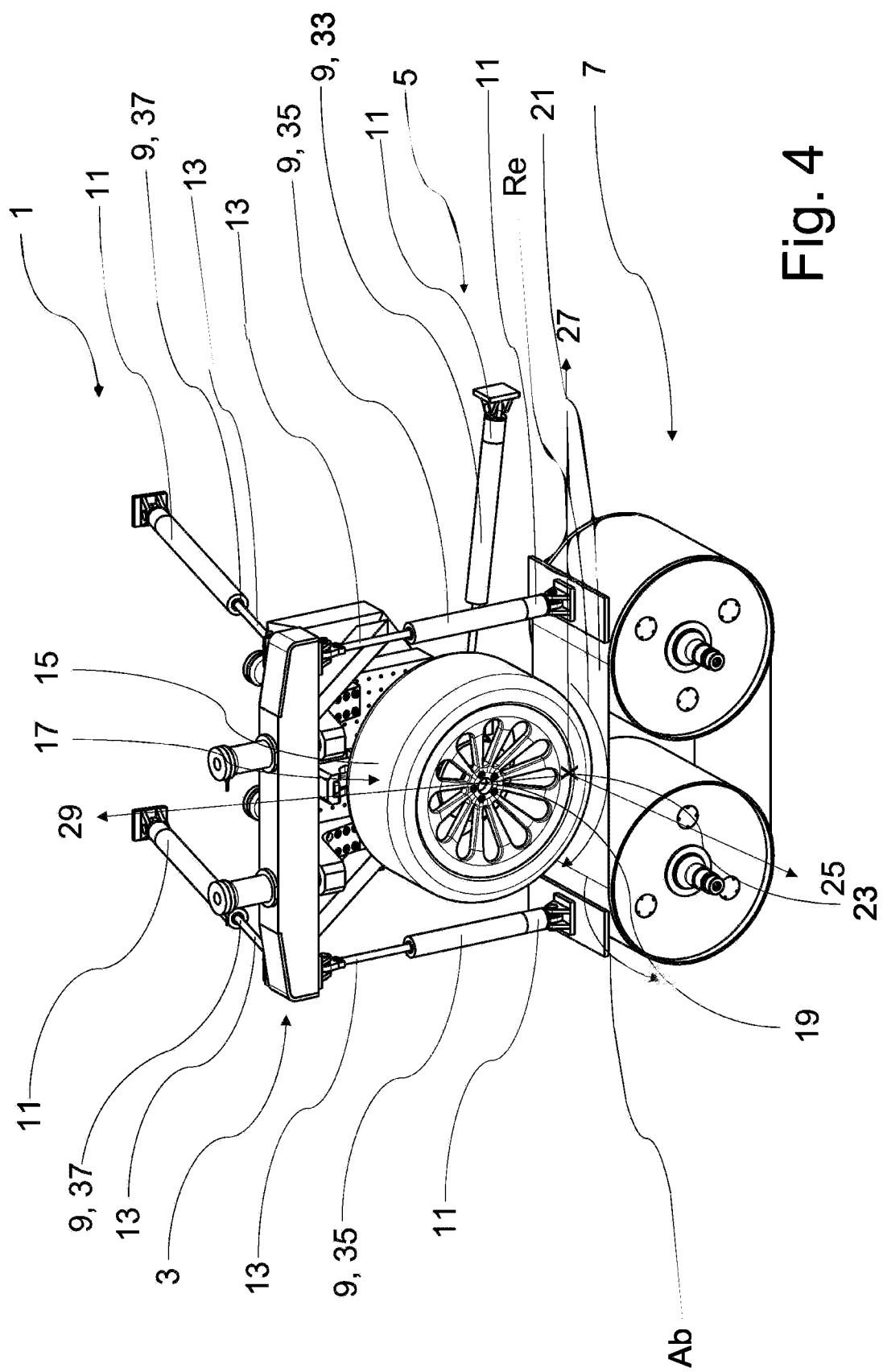
Figure 5:
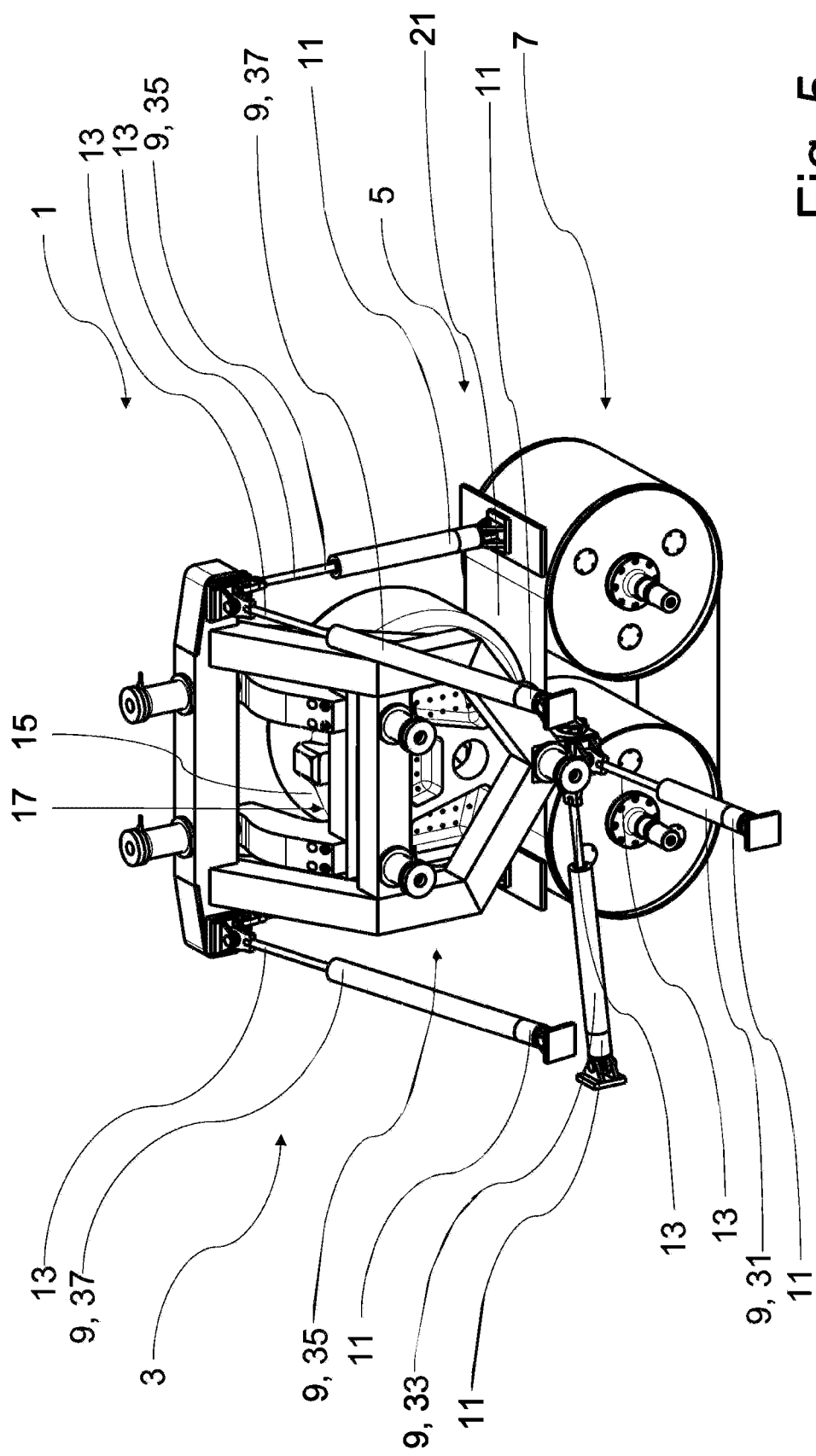

FIGS. 4 and 5 each illustrate a schematic view of a second embodiment of the tire test stand 1 according to the invention. The second embodiment of the tire test stand 1 according to the invention substantially corresponds to the first embodiment of the tire test stand 1 according to the invention. However, the tire holder 3 of the second embodiment does not have a first pivot arm 39, a second pivot arm 41, a first coupling rod 43 and a second coupling rod 45. Rather, the two steering/camber drive elements 37 are each pivotably attached at a first end 11 to the frame and pivotably attached at the second end 13 to the tire holder 3, in particular to the portion of the tire holder 3. Furthermore, in the second embodiment of the tire test stand 1, the two radial drive elements 35 are aligned perpendicularly to the tangential planes and are aligned parallel to each other. Furthermore, in the second embodiment of the tire test stand 1, the two steering/camber drive elements 37 are arranged parallel to each other. Furthermore, the first radial drive element 35 and the first steering/camber drive element 37 are pivotably attached to the tire holder 3 in such a manner that a first straight line, which is oriented along the main direction of extent of the first radial drive element 35, and a second straight line, which is oriented along the main direction of extent of the first steering/camber drive element 37, intersect. Furthermore, the second radial drive element 35 and the second steering/camber drive element 37 are pivotably attached to the tire holder 3 in such a manner that a first straight line, which is oriented along the main direction of extent of the second radial drive element 35, and a second straight line, which is oriented along the main direction of extent of the second steering/camber drive element 37, intersect. Furthermore, the tire holder 3 of the second embodiment of the tire test stand 1 according to the invention has the frame portion 47, tire portion 49 and force measuring unit 51 shown in FIG. 3 and described in conjunction with the first embodiment.

The features, technical effects and/or advantages described in conjunction with the first embodiment of the tire test stand 1 according to the invention also apply at least in an analogous manner to the second embodiment of the tire test stand 1 according to the invention, and therefore a corresponding repetition is dispensed with at this juncture.

Figure 6:
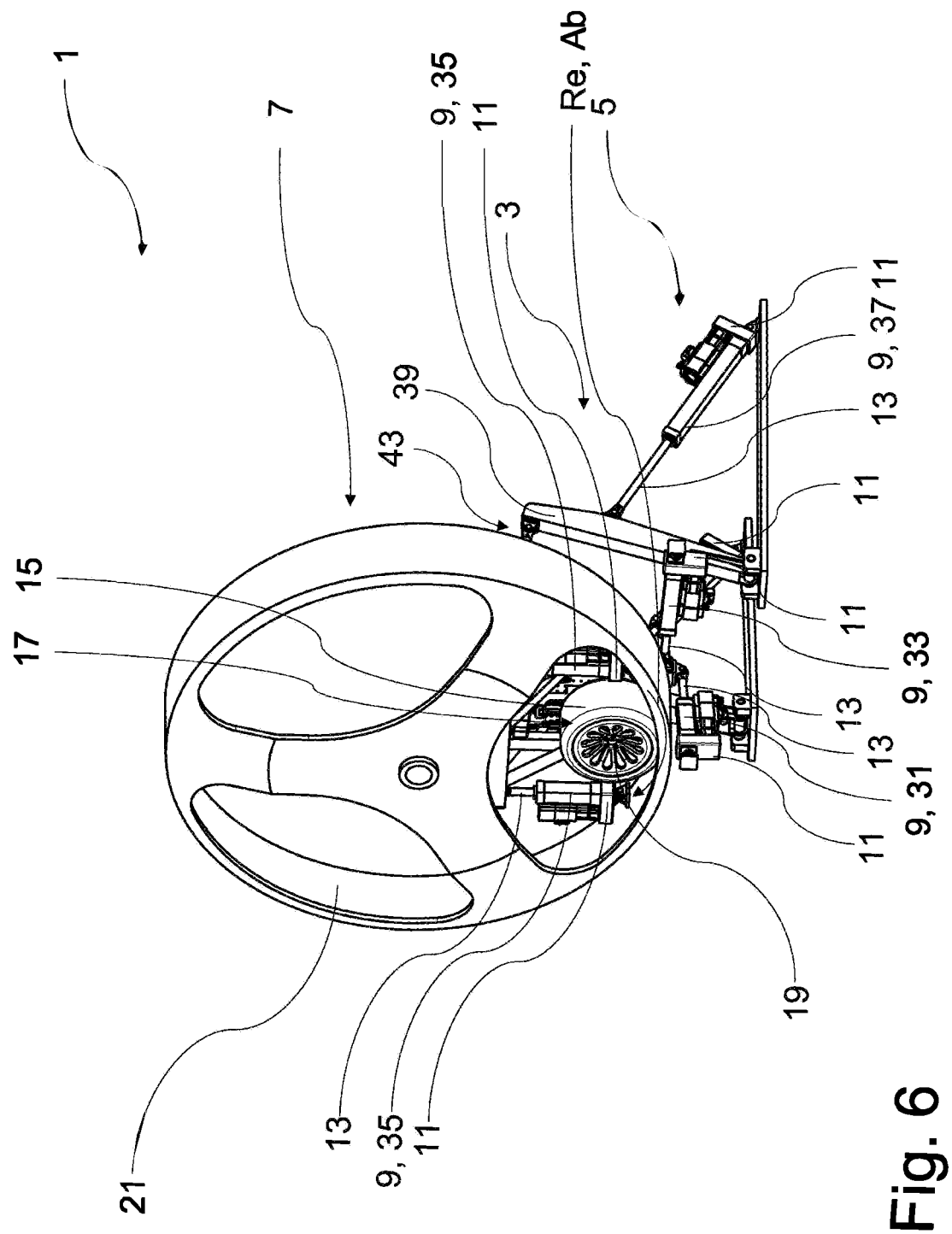
Figure 7:
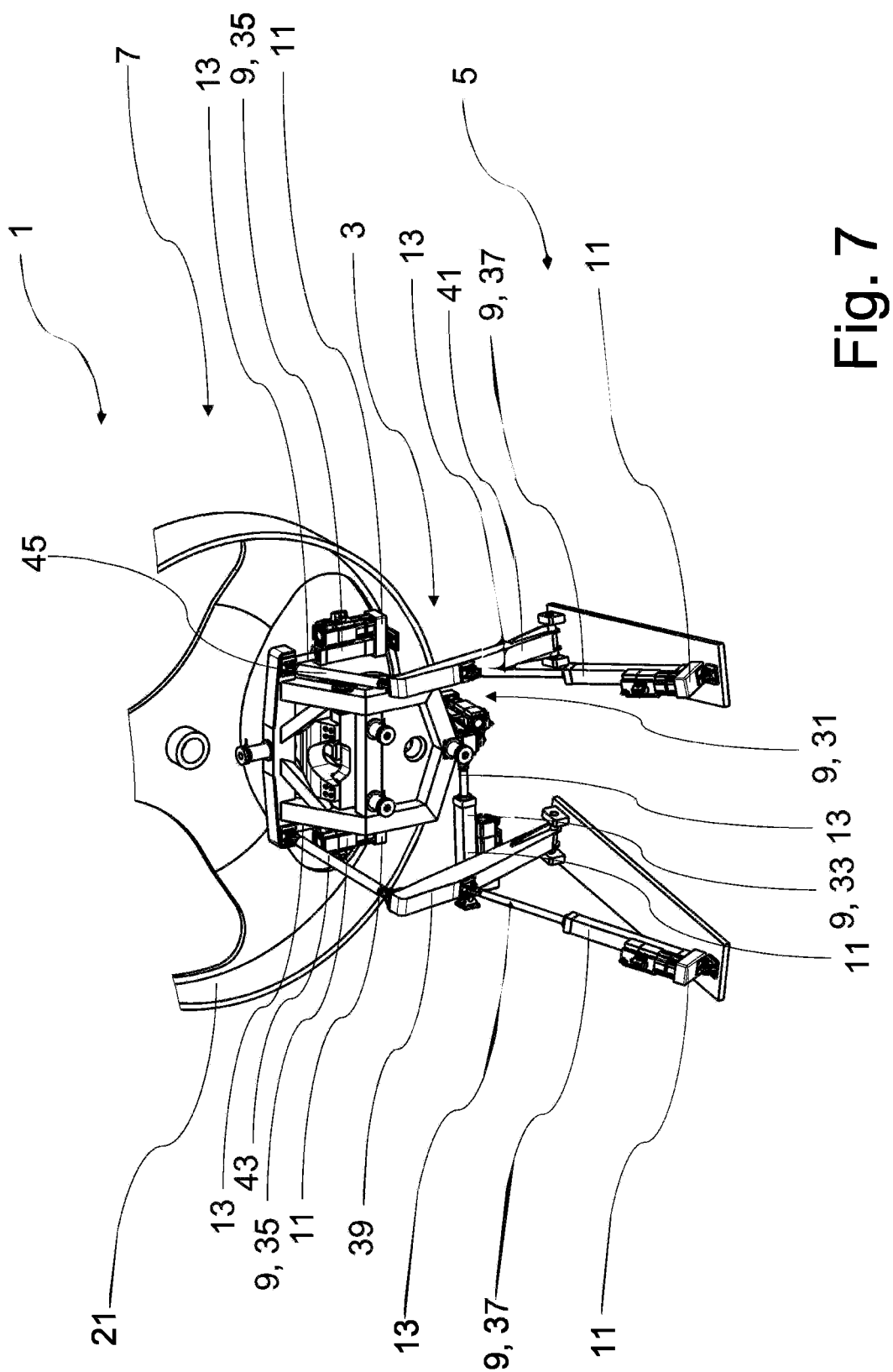

FIGS. 6 and 7 each illustrate a schematic view of a third embodiment of the tire test stand 1 according to the invention. The third embodiment of the tire test stand 1 according to the invention substantially corresponds to the first embodiment of the tire test stand 1 according to the invention. In the third embodiment, however, the rolling surface unit 7 has a curved rolling surface 21, which is formed by an inner circumferential surface of a drum that is rotatably mounted on the frame and is drivable rotatably with the aid of the rolling surface drive unit. Furthermore, the lateral drive element 31 of the third embodiment is arranged in a direction which runs parallel to the direction of the radial force component 29 (see FIGS. 1 and 4). The lateral drive element 31 is arranged below the tire 15 and below the rolling surface 21 in FIGS. 6 and 7. The arrangement of the lateral drive element 31 in a direction which runs parallel to the direction of the radial force component 29 provides a particularly space-saving variant of the tire test stand 1. The use of a revolving surface of a rotatably mounted drum as a rolling surface is particularly advantageous in this context, since this provides a particularly large space for the lateral drive element 31, and therefore the latter can be of correspondingly robust design. Furthermore, the radial drive elements 35 are arranged in such a manner that the tire 15 is arranged centrally between the radial drive elements 35. Each of the radial drive elements 35 is pivotably attached at its first end 11 to the frame, the two pivot axes extending along the same straight line, but on which the contact point 23 is not arranged. In the third embodiment, the contact point 23 is arranged in the tangential planes, the straight line along which the two pivot axes run running parallel to the tangential planes and being spaced therefrom in the direction of the axis of rotation 19. Furthermore, the radial drive elements 35 are pivotably attached at the second ends 13 to the tire holder 3, the two pivot axes running along the same straight line. Furthermore, in the third embodiment of the tire test stand 1, the two radial drive elements 35 are aligned perpendicularly to the tangential planes and are aligned parallel to each other. Furthermore, the tire holder 3 of the third embodiment of the tire test stand 1 according to the invention has the frame portion 47, tire portion 49 and force measuring unit 51 shown in FIG. 3 and described in conjunction with the first embodiment.

The features, technical effects and/or advantages described in conjunction with the first embodiment and in conjunction with the second embodiment of the tire test stand 1 according to the invention also apply at least in an analogous manner to the third embodiment of the tire test stand 1 according to the invention, and therefore a corresponding repetition is dispensed with at this juncture.

FIG. 8 illustrates two schematic views of a fourth embodiment of the tire test stand 1 according to the invention. The fourth embodiment of the tire test stand 1 according to the invention substantially corresponds to the first embodiment of the tire test stand 1 according to the invention. The arrangement of the tire test stand 1 illustrated in FIG. 8 may also be referred to as a horizontal arrangement. In the fourth embodiment, however, the rolling surface unit 7 has a curved rolling surface 21 which is formed by an outer circumferential surface of a drum which is rotatably mounted on the frame and is drivable rotatably with the aid of the rolling surface drive unit. In the fourth embodiment, the radial drive elements 35 are offset from one another in the initial configuration in the direction of the axis of rotation 19 (direction of the axis of rotation), such that, for example, in the left schematic view in FIG. 8, the tire 15 can be brought from above to the tire holder 3 and upward away therefrom. Owing to the fact that the radial drive elements 35 are offset from one another in the direction of the axis of rotation 19 in the initial configuration, heavy tires 15 in particular can be attached to and removed from the tire test stand 1 using a crane.

The features, technical effects and/or advantages described in conjunction with the first embodiment, in conjunction with the second embodiment, and in conjunction with the third embodiment, of the tire test stand 1 according to the invention also apply at least in an analogous manner to the fourth embodiment of the tire test stand 1 according to the invention, and therefore a corresponding repetition is dispensed with at this juncture.

In addition, it should be pointed out that "comprising" does not exclude other elements or steps and "a" or "an" does not exclude a plurality. Furthermore, it should be pointed out that features that have been described with reference to one of the above exemplary embodiments can also be used in combination with other features of other exemplary embodiments described above. Reference signs in the claims should not be regarded as limiting.

REFERENCE SIGNS 1 tire test stand
3 tire holder
5 hexapod arrangement
7 rolling surface unit
9 linear drive element
11 first end of a linear drive element
13 second end of a linear drive element
15 tire
17 tread
19 axis of rotation
21 rolling surface
23 contact point
25 lateral force component
27 tangential force component
29 radial force component
31 lateral drive element
33 tangential drive element
35 radial drive element
37 steering/camber drive elements
39 first pivot arm
41 second pivot arm
43 first coupling rod
45 second coupling rod
47 frame portion
49 tire portion
51 force measuring unit
53 lateral force measuring element
55 tangential force measuring element
57 radial force measuring element
Re tire revolving direction
Ab revolving direction of the rolling surface

The invention claimed is:

1. A tire test stand, comprising:
a frame;
a tire holder to which a tire with a tread can be attached so as to be rotatable about an axis of rotation;
a hexapod arrangement with six linear drive elements, each of the six linear drive elements being attached at a first end to the frame and at a second end to the tire holder; and
a rolling surface unit having a rolling surface configured to be moved in relation to the frame,
wherein when the tire is rotatably attached to the tire holder, the tire can be brought by adjustment of the linear drive elements of the hexapod arrangement into a contact position in which the tread of the tire contacts the rolling surface,
wherein when the tread and the rolling surface are in contact and the rolling surface is moved in relation to the tire, the tire rolls on the rolling surface;
wherein, in an initial configuration, a tangential plane running parallel to the axis of rotation on the tread is identical to a tangential plane on the rolling surface, a tangential speed of the tread is the same as a tangential speed of the rolling surface at a contact point between the tread and the rolling surface, and each force acting on the tire can be divided into a lateral force component running in the tangential planes and parallel to the axis of rotation, a tangential force component running in the tangential planes and perpendicular to the lateral force component, and a radial force component running perpendicular to the tangential planes; and
wherein the six linear drive elements are arranged in the initial configuration in such a manner that at least one linear drive element of the six linear drive elements is arranged such that when the at least one linear drive element exerts a force on the tire, a largest force component of said force is oriented in the direction of the lateral force component,
at least one linear drive element of the six linear drive elements is arranged such that when the at least one linear drive element exerts a force on the tire, a largest force component of said force is oriented in the direction of the tangential force component, and
at least one linear drive element of the six linear drive elements is arranged such that when the at least one linear drive element exerts a force on the tire, a largest force component of said force is oriented in the direction of the radial force component.

2. The tire test stand of claim 1, wherein when the tire is rotatably attached to the tire holder and said tire is in the contact position, the at least one linear drive element, which is arranged such that when the at least one linear drive element exerts a force on the tire, the largest force component of said force is oriented in the direction of the lateral force component, is arranged in a direction which runs parallel to the direction of the radial force component.

3. The tire test stand of claim 1, wherein two linear drive elements of the six linear drive elements are each arranged such that when the two linear drive elements exert forces on the tire, the greatest force component of said forces is oriented in the direction of the radial force component.

4. The tire test stand of claim 3, wherein when the tire is rotatably attached to the tire holder, the tire is arranged in the contact position between the two linear drive elements which are each arranged such that when the two linear drive elements each exert a force on the tire, the largest force component of each of said forces is oriented in the direction of the radial force component.

5. The tire test stand of claim 4, wherein the two linear drive elements, which are each arranged such that when the two linear drive elements each exert a force on the tire, the greatest force component of each of said forces is oriented in the direction of the radial force component, are offset from one another in the direction of the axis of rotation in the initial configuration.

6. The tire test stand of claim 1, wherein at least one linear drive element of the six linear drive elements is arranged in the initial configuration such that, by adjustment of the at least one linear drive element, the tire can be pivoted about a horizontal axis and a vertical axis from its orientation in the initial configuration.

7. The tire test stand of claim 1, wherein two linear drive elements of the six linear drive elements are each arranged in the initial configuration such that, by adjustment of the two linear drive elements, the tire can be pivoted about a horizontal axis and a vertical axis from its orientation in the initial configuration.

8. The tire test stand of claim 7, wherein the tire holder has a first pivot arm which is pivotably attached to the frame and to which a second en of a first linear drive element of the at least one linear drive element is pivotably attached, which pivot arm is arranged in the initial configuration such that, by adjustment of the linear drive element, the tire can be pivoted about a horizontal axis and a vertical axis from its orientation in the initial configuration.

9. The tire test stand of claim 8, wherein the tire holder has a second pivot arm which is pivotably attached to the frame and to which a second end of a second linear drive element of the at least one linear drive element is pivotably attached, wherein the second pivot arm is arranged in the initial configuration such that, by adjustment of the linear drive element, the tire can be pivoted about a horizontal axis and a vertical axis from its orientation in the initial configuration.

10. The tire test stand of claim 1, wherein the tire holder has a frame portion fastened to the frame and a tire portion to which the tire can be rotatably attached, wherein the frame portion and the tire portion are connected via a force measuring unit, the force measuring unit having at least one lateral force measuring element which extends in the direction of the lateral force component, at least one tangential force measuring element which extends in the direction of the tangential force component, and at least one radial force measuring element which extends in the direction of the radial force component when the tire test stand is in the initial configuration.

11. The tire test stand of claim 1, wherein at least one of the linear drive elements of the hexapod arrangement is configured as a hydraulic cylinder.

12. The tire test stand of claim 1, wherein at least one of the linear drive elements of the hexapod arrangement is configured as an electromechanical linear drive.

13. The tire test stand of claim 1, wherein the tire test stand has a tire drive unit configured such that when the tire is rotatably attached to the tire holder, the tire drive unit can drive said tire in a tire revolving direction.

14. The tire test stand of claim 1, further comprising a tire braking unit which, when the tire is rotatably attached to the tire holder, the tire braking unit is configured to brake said tire in a tire revolving direction.

* * * * *